United States Patent
Saraie et al.

(10) Patent No.: US 9,464,947 B2
(45) Date of Patent: Oct. 11, 2016

(54) CRYOGENIC TEMPERATURE MEASURING RESISTOR ELEMENT

(71) Applicant: OKAZAKI MANUFACTURING COMPANY, Hyogo (JP)

(72) Inventors: Shinichiro Saraie, Hyogo (JP); Takashi Mihara, Hyogo (JP); Koichi Ito, Hyogo (JP)

(73) Assignee: OKAZAKI MANUFACTURING COMPANY, Hyogo (JP)

( * ) Notice: Subject to any disclaimer, the term of this patent is extended or adjusted under 35 U.S.C. 154(b) by 0 days.

(21) Appl. No.: 13/982,700

(22) PCT Filed: Oct. 19, 2012

(86) PCT No.: PCT/JP2012/006718
§ 371 (c)(1),
(2) Date: Jul. 30, 2013

(87) PCT Pub. No.: WO2014/061069
PCT Pub. Date: Apr. 24, 2014

(65) Prior Publication Data
US 2015/0211942 A1 Jul. 30, 2015

(51) Int. Cl.
*G01K 7/16* (2006.01)
*H01C 17/00* (2006.01)
*G01K 13/00* (2006.01)
*H01C 7/04* (2006.01)
*C03B 19/09* (2006.01)
(Continued)

(52) U.S. Cl.
CPC ............ *G01K 13/006* (2013.01); *C03B 19/09* (2013.01); *G01K 7/06* (2013.01); *G01K 7/16* (2013.01); *G01K 7/183* (2013.01); *H01C 7/04* (2013.01); *G01K 2203/00* (2013.01)

(58) Field of Classification Search
CPC ........................................................ G01K 7/16
USPC ................... 374/185, 163, 208, 100; 338/13
See application file for complete search history.

(56) References Cited

U.S. PATENT DOCUMENTS

| | | | |
|---|---|---|---|
| 2,988,718 A * | 6/1961 | Muehlner | 338/28 |
| 3,233,460 A * | 2/1966 | Daunt et al. | 374/176 |
| 3,367,765 A * | 2/1968 | Nelson | A01N 43/60 504/155 |

(Continued)

FOREIGN PATENT DOCUMENTS

| | | |
|---|---|---|
| JP | 53-053758 | 5/1978 |
| JP | 57-124221 A | 8/1982 |

(Continued)

OTHER PUBLICATIONS

K.Suzuki et al.; "Interchangeable Pt-Co Cryogenic Temperature Measuring Resistor"; Yokogawa Technical Report (1988); vol. 32, No. 3; pp. 29-32.

*Primary Examiner* — Gai Kaplan Verbitsky
(74) *Attorney, Agent, or Firm* — Studebaker & Brackett PC

(57) ABSTRACT

Provided is a cryogenic temperature measuring resistor element including a metallic temperature measuring resistor wire, an electric insulator made of a polycrystalline ceramic material, and a filler filled between the electric insulator and the temperature measuring resistor wire. The filler includes polycrystalline inorganic electric insulating powder, particles of the insulating powder being connected by glass. The glass has a lower softening point than respective melting points of the inorganic electric insulating powder, the temperature measuring resistor wire, and the electric insulator.

6 Claims, 5 Drawing Sheets

(51) Int. Cl.
*G01K 7/06* (2006.01)
*G01K 7/18* (2006.01)

(56) References Cited

U.S. PATENT DOCUMENTS

| | | | | |
|---|---|---|---|---|
| 3,412,359 | A | * | 11/1968 | Schwyn et al. ............... 338/30 |
| 3,436,713 | A | * | 4/1969 | Di Noia ........................ 338/28 |
| 3,477,058 | A | * | 11/1969 | Willem et al. ............... 338/238 |
| 4,064,757 | A | * | 12/1977 | Hasegawa ............... C22C 45/10 148/403 |
| 4,586,020 | A | * | 4/1986 | Naruo ..................... H05B 3/48 174/102 P |
| 4,881,056 | A | * | 11/1989 | Mizukoshi et al. ............. 338/4 |
| 5,139,858 | A | * | 8/1992 | Beamish .................. G01K 7/16 204/192.21 |
| 5,161,894 | A | * | 11/1992 | Bourigault ................... 374/185 |
| 5,181,008 | A | * | 1/1993 | Martin et al. .................. 338/28 |
| 5,216,570 | A | * | 6/1993 | Yorozuya ................ H01C 7/12 174/140 R |
| 5,842,788 | A | * | 12/1998 | Danley et al. .................. 374/12 |
| 6,924,245 | B2 | * | 8/2005 | Sakamoto ........................ 501/5 |
| 7,026,909 | B2 | * | 4/2006 | Glozman et al. ............... 338/28 |
| 9,153,366 | B2 | * | 10/2015 | Hirose ..................... G01K 7/22 |
| 2003/0220185 | A1 | * | 11/2003 | Sakamoto ..................... 501/136 |
| 2007/0148564 | A1 | * | 6/2007 | Iketa et al. ........................ 430/7 |
| 2008/0222965 | A1 | * | 9/2008 | Querel et al. ................... 51/298 |
| 2014/0321508 | A1 | * | 10/2014 | Buchner et al. ............... 374/185 |

FOREIGN PATENT DOCUMENTS

| | | | |
|---|---|---|---|
| JP | 57-126035 | U | 8/1982 |
| JP | 61-202129 | A | 9/1986 |
| JP | 62-037145 | Y2 | 9/1987 |
| JP | 01-025102 | B2 | 5/1989 |
| JP | 01191401 | A * | 8/1989 |
| JP | 07183165 | A * | 7/1995 |

* cited by examiner

CRYOGENIC TEMPERATURE MEASURING RESISTOR ELEMENT

TECHNICAL FIELD

The present invention relates to a temperature measuring resistor element for measuring temperatures in a cryogenic temperature region of 4 K (K: unit of absolute temperature) to 90 K.

BACKGROUND ART

Temperature measurement by a temperature measuring resistor element is performed using a property whereby an electric resistance of a temperature measuring resistor wire housed in an interior of the temperature measuring resistor element varies according to a temperature such that the temperature of the temperature measuring resistor wire serves as a temperature output of the temperature measuring resistor element. More specifically, a specified current is passed through lead wires connected to respective ends of the temperature measuring resistor wire, an electric resistance value is obtained from a voltage drop, and the electric resistance value is converted into a temperature. As is well known, a voltage drop measurement method includes a two-wire system, a three-wire system, and a four-wire system, depending on the number of bifurcations of the lead wire.

In a usually employed configuration of a temperature measuring resistor element, a coil-shaped temperature measuring resistor wire is disposed in inorganic electric insulating powder accommodated in a housing.

This configuration is usually employed in a temperature measuring resistor element because of the easy manufacture and the low cost. Another reason why this configuration is typically employed is that when an external force is exerted on the temperature measuring resistor wire due to a difference in the thermal expansion coefficient between the temperature measuring resistor wire and a supporting structure thereof, the length and the sectional area of the temperature measuring resistor wire vary, leading to a variation in the electric resistance and then a temperature measurement error, but in the configuration where the coil-shaped temperature measuring resistor wire is disposed in the inorganic electric insulating powder, little force is exerted on the temperature measuring resistor wire, and therefore a temperature measurement error is unlikely to occur.

In a temperature measuring resistor element, a coil-shaped temperature measuring resistor wire, to the opposite ends of which lead wires are connected, is passed through two longitudinal through holes formed in a cylindrical electric insulator having a substantially circular cross-section, and serving as an housing. The two lead wires connected to the opposite ends of the resistor wire are exposed from end portions of the two through holes, the end portion being on the same side. The temperature measuring resistor wire is disposed in filler in the through holes, the filler made of an inorganic electric insulating powder being filled into gaps in the through holes, and the opposite end portions of the through holes are sealed by sealers to prevent the internally placed filler from falling out.

Polycrystalline powder made of such material as alumina, magnesia, silica, or a mixture of these materials is used as the inorganic electric insulating powder serving as the filler. A ceramic formed by molding a polycrystal made of such material as alumina, magnesia, silica, a mixture of these materials is used as the electric insulator.

A polycrystalline adhesive having alumina, magnesia, silica, zircon, or a mixture of these materials as a main component is usually used as the sealer, and an enamel such as epoxy resin may also be used. Further, as shown in FIG. 1A of Patent Document 2, the sealer is not provided in a temperature measuring resistor element used in a condition where there is no possibility that inorganic electric insulating powder falls out.

As described in JISC1604 "Temperature Measuring Resistors", platinum is usually used as a material for the temperature measuring resistor wire. However, when a measured temperature falls to or below 73 K (−200° C.), a variation rate in the electric resistance of the platinum relative to a temperature variation decreases, leading to a lowering of the measurement sensitivity, and therefore an increase in the temperature measurement error, making measurement impossible. Hence, when temperatures of 73 K or less are also subject to measurement, a platinum-cobalt alloy, as described in Patent Document 1 and Non-Patent Document 1, is usually used as the material for the temperature measuring resistor wire. With a platinum-cobalt alloy, the measurement sensitivity lowers small even in a low temperature region, and therefore temperature measurement can be performed with a high degree of precision in a temperature range of 4 K to at least 325 K, as illustrated in Non-Patent Document 1. The reason why 4 K is a lower limit is that 4 K is the boiling point of helium, and at temperatures no higher than 4 K, temperature calibration is difficult.

PRIOR ART DOCUMENTS

Patent Document

Patent Document 1: Japanese Unexamined Patent Publication No. S53-53758 "Temperature Detection Element Material"

Patent Document 2: Japanese Unexamined Utility Model Publication No. S57-126035 "Temperature Measuring Resistor Element"

Non-Patent Document

Non-Patent Document 1: "Interchangeable Pt—Co Cryogenic Temperature Measuring Resistor" Yokogawa Technical Report (1988) Vol. 32 No. 3 P. 29-32

Problem to be Solved by the Invention

In a conventional temperature measuring resistor element which uses a low temperature measuring resistor wire, material of which is a platinum-cobalt alloy, being placed in inorganic electric insulating powder accommodated in a housing, there is the problem that arises at temperatures of approximately 90 K or less, and the temperature measurement error increases toward a positive side as the temperature decreases, especially the error increases rapidly in the case where the temperature falls to or below 10 K. Table 1 shows the temperature measurement error according to a temperature measuring resistor element, which uses a low temperature measuring resistor wire, material of which is a platinum-cobalt alloy, where the temperature is measured in a low temperature region of 4 K to 10 K, and the current to measure an electric resistance is set at standard values of 0.2 mA, 1 mA, and 2 mA. Further, FIG. 7 shows a graph according to Table 1.

TABLE 1

[MEASUREMENT RESULTS OBTAINED WITH CONVENTIONAL
TEMPERATURE MEASURING RESISTOR ELEMENT]

| MEASURED TEMPERATURE | TEMPERATURE MEASUREMENT ERROR | | |
|---|---|---|---|
| | MEASUREMENT CURRENT 0.2 mA | MEASUREMENT CURRENT 1.0 mA | MEASUREMENT CURRENT 2.0 mA |
| 4 K | +1.1 K | +4.1 K | +7.9 K |
| 8 K | +1.2 K | +1.6 K | +2.3 K |
| 10 K | +0.4 K | +0.6 K | +1.0 K |

At a measured temperature of 90 K or higher, the measured voltage drop in the temperature measuring resistor wire increases as the measurement current increases, leading to an increase in the SN ratio (a ratio of a signal component to a noise component), and therefore measurement can be performed without being affected by noise. However, the temperature measurement error in Table 1 and FIG. 7 shows another problem that when the measurement current is increased in order to reduce the effect of noise in a noisy environment, the error increases.

As described above, with the conventional temperature measuring resistor element, the positive side temperature measurement error increases at temperatures of approximately 90 K or less, especially, in a temperature region of 10 K to 4 K. Also the error increases when the measurement current is increased in order to increase the SN ratio.

A possible cause of the error is that when the temperature falls to or below 90 K, air existing in spaces in the inorganic electric insulating powder begins to liquefy due to a reduction in the saturated vapor pressure caused by the temperature reduction. It deteriorates the function that the air serves as a heat transmitting medium in the gas state, leading to a reduction in the thermal conductivity. As a result, the ability of radiating a Joule heat generated by the measurement current decreases, so that the temperature of the temperature measuring resistor wire becomes higher than an outside temperature.

In other words, at a temperature where the air exists in the gas state, the Joule heat generated in the temperature measuring resistor wire by the measurement current is radiated to the outside by the way of the housing, i.e., the electric insulator, owing to transmission through the inorganic electric insulating powder and transmission by molecular movements of the air existing in the inorganic electric insulating powder, and therefore the difference between the outside temperature and the temperature of the temperature measuring resistor wire remains very small. When the temperature falls to or below 90 K, however, the air component begins to liquefy, and when the temperature falls to or below 10 K, substantially the entire amount of air changes to liquid droplets, and then solidifies, and the volume of the air becomes extremely small, with the result that the inorganic electric insulating powder exists in substantially vacuum.

Hence, the Joule heat generated in the temperature measuring resistor wire is conducted only through the inorganic electric insulating powder, and radiated to the outside via the electric insulator. As a result of this deterioration in the heat radiation performance, it is considered that the Joule heat is not radiated sufficiently, and therefore, at 90 K or less, the temperature of the temperature measuring resistor wire begins to be higher than the outside temperature. While in the low temperature region of 10 K to 4 K, the temperature of the temperature measuring resistor wire reaches temperatures such as those shown in Table 1 and FIG. 7. Moreover, the Joule heat is proportionate to the square of the measurement current, and therefore the Joule heat increases as the measurement current increases, contributing to an increase in the temperature of the temperature measuring resistor wire due to insufficient radiation of the Joule heat.

In a low temperature region where substantially all of the gas liquefies and solidifies, a high vacuum condition is naturally established. Even in the temperature measuring resistor element of a structure having no sealer, as shown in FIG. 1(a) of Patent Document 2, there is the similar problem that the inorganic electric insulating powder exists in the vacuum state, and then a temperature measurement error occurs on the positive side.

SUMMARY OF THE INVENTION

The present invention has been worked out in consideration of the error described above, and an object thereof is to provide a temperature measuring resistor element that can measure temperatures with a high degree of precision in a cryogenic temperature region of 90 K to 4 K.

According to an aspect of the invention, a cryogenic temperature measuring resistor element comprises a temperature measuring resistor wire, a housing for accommodating the temperature measuring resistor wire, and filler filled between the housing and the temperature measuring resistor wire, the filler including polycrystalline inorganic electric insulating powder, particles of the insulating powder being connected with one another by glass.

Further features, objects, configurations, actions, and effects of the present invention can be understood easily from the following detailed description, which is to be read together with the attached drawings.

DETAILED DESCRIPTION OF PREFERRED EMBODIMENTS OF THE PRESENT INVENTION

Figure 1:
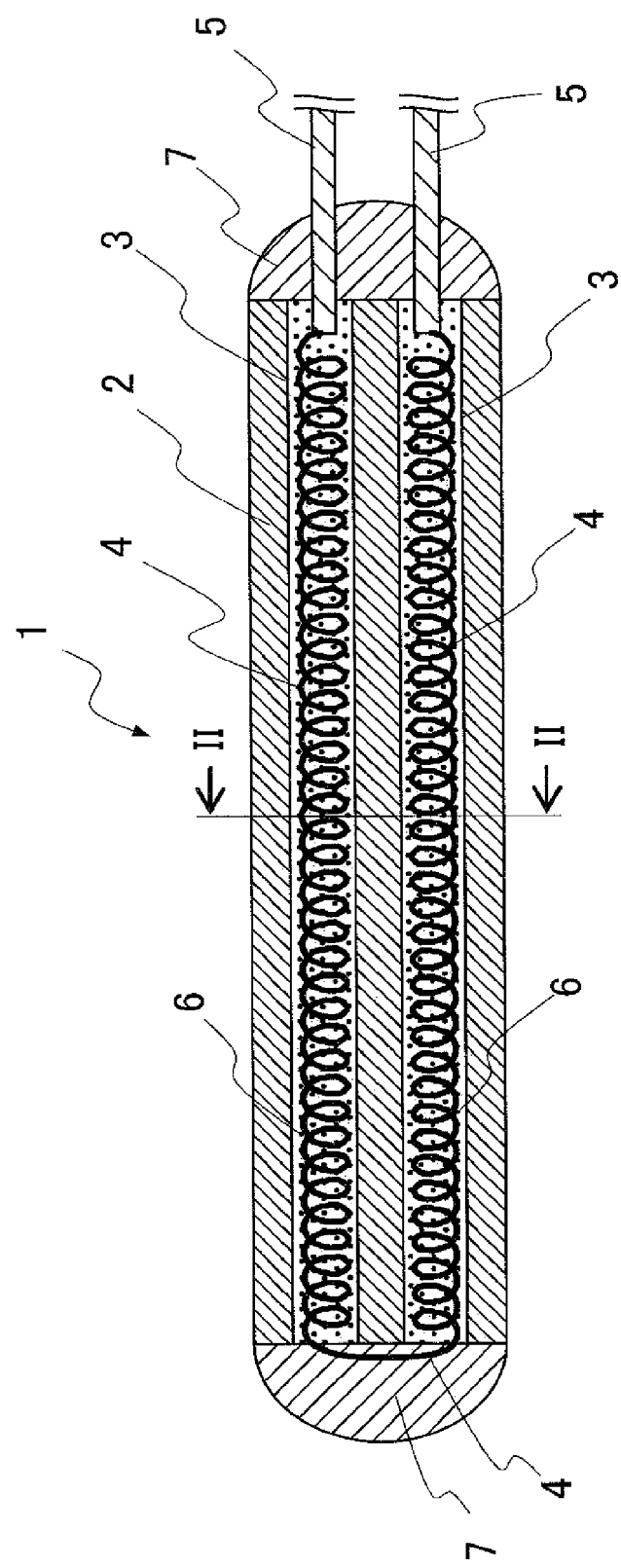
FIG. 1 is a longitudinal sectional view of a cryogenic temperature measuring resistor element according to the present invention.

The present inventor created a temperature measuring resistor element to be described below as a result of committed research with the aim of preventing the problems observed in the temperature measuring resistor element according to the prior art, namely that at temperatures of 90 K or less, the temperature measurement error increases toward the positive side as the temperature decreases, the error increases particularly in the low temperature region of 10 K to 4 K, and the error also increases when the measurement current is increased in order to increase the SN ratio.

A cryogenic temperature measuring resistor element includes a temperature measuring resistor wire, a housing in which the temperature measuring resistor wire is accommodated, and a filler filled between the housing and the temperature measuring resistor wire. The filler includes a mixture of polycrystalline inorganic electric insulating powder and glass powder, the glass powder is made of an amorphous electric insulating material having a softening point lower than respective melting temperatures of the inorganic electric insulating powder, the temperature measuring resistor wire, and the housing. The filler is filled between the housing and the temperature measuring resistor wire, and is heated at a temperature higher than the softening point of the glass powder and lower than the respective melting temperatures of the inorganic electric insulating powder, the temperature measuring resistor wire, and the housing so as to melt only the glass powder. Thereafter, the glass powder is cooled and then solidified.

The present invention is different from the conventional one, the filler of which includes only a polycrystalline inorganic electric insulating powder. In the present invention, a mixture of a polycrystalline inorganic electric insulating powder and a glass powder made of an amorphous electric insulating material is filled between the housing and the temperature measuring resistor wire as the filler, and the filler is heated at a heating temperature higher than the softening point of the glass powder so as to melt the glass powder in the housing, and then cooled to solidify the glass powder.

Amorphous glass begins to melt when the temperature thereof exceeds a transition point. At this point, a solid substance begins to have a liquid property. When the temperature is increased further so as to reach the temperature of the softening point, which is also known as the Littleton-point, the glass melts to a condition where it deforms under its own weight. Hence, the glass powder in the filler is heated to or above the softening point to thereby spread through spaces in the inorganic electric insulating powder, and then cooled to permit a considerable amount of inorganic electric insulating powder to be connected by the glass.

The metals, single crystals, and polycrystals, on the other hand, do not have a transition point and a softening point, and therefore substantially maintain their shape until the temperature thereof reaches the melting point. When the temperature exceeds the melting point, these substances melt into the liquid form.

The heating temperature is therefore set at a temperature no higher than the respective melting point of the inorganic electric insulating powder, the temperature measuring resistor wire, and the housing, and no lower than the softening point of the glass powder.

According to an aspect of the present invention, by melting only the glass powder mixed into the inorganic electric insulating powder, a considerable number of particles of the inorganic electric insulating powder are connected with one another by the glass. As a result of this connection, the high thermal conductivity is realized, and therefore, the phenomenon observed in the prior art will not arise even when a gas such as air existing in spaces in the inorganic electric insulating powder liquefies and then solidifies in a low temperature region of 90 K or less due to the low temperature, leading to the poor radiation of the Joule heat generated by the measurement current, and the positive side temperature measurement error occurs. As a result, the temperature measurement can be performed with a high degree of precision and without being affected by Joule heat, even when decreasing to a low temperature of 4 K. Moreover, since the thermal conductivity of the filler is maintained even at low temperatures, a temperature response of the temperature measuring resistor wire relative to a temperature variation in the measurement subject does not deteriorate. As a result, the additional effect that a response speed in the temperature measurement does not decrease can be also obtained.

The polycrystalline powder of alumina, magnesia, silica, or a mixture of these materials may be used as a material for the inorganic electric insulating powder of the filler, in the same way as the conventional inorganic electric insulating powder. Further, the ceramic formed by molding a polycrystal made of alumina, magnesia, silica, or a mixture of these materials may be used as a material for the housing in the same way as the conventional housing. The melting points of these materials are all no lower than 1500° C., while the softening point of the amorphous glass, excluding special high-temperature glass, is no higher than 800° C.

The wire which is described in Patent Document 1 and Non-Patent Document 1, and is made of a platinum-cobalt alloy and exhibits preferable measurement precision in a low temperature region may be used for the temperature measuring resistor wire, in the conventional way. The melting point of the platinum-cobalt alloy is much higher than the softening point of the glass, excluding special high-temperature glass.

With the melting points and softening points of the materials described above, it is possible to perform heating so as to melt only the glass powder while maintaining the shapes of the inorganic electric insulating powder, the housing, and the temperature measuring resistor wire.

As described in Non-Patent Document 1, the electric resistance value of the platinum-cobalt alloy varies according to an amount of internal strain. Therefore, when the internal strain varies, the temperature measurement value also varies, leading to an error. Meanwhile, the degree of annealing in the temperature measuring resistor wire made of platinum-cobalt alloy varies in accordance with the heating temperature to melt the glass powder, leading to a variation in the amount of internal strain therein. Therefore, the heating temperature to melt the glass powder is preferably set at a temperature which ensures the internal strain keeping the temperature measurement error smaller. In consideration of these points, an alloy having 0.5 mol % of cobalt to platinum is preferably used as the material for the temperature measuring resistor wire, and the heating temperature is preferably 460° C. or higher and 520° C. or lower. In this temperature range, the temperature measurement error of the cryogenic temperature measuring resistor element according to the present invention in a low temperature region can be suppressed, as illustrated by results of tests to be described later.

Further, by heating the glass powder in the filler to or above the softening point, the glass powder melts so as to spread through spaces in the inorganic electric insulating powder. When the glass powder is cooled, a considerable amount of the inorganic electric insulating powder is connected by the glass. To make the glass powder spread through spaces in the inorganic electric insulating powder reliably, the heating temperature is preferably set at a temperature at least 50° C. or more higher than the softening point. In other words, the heating temperature is preferably set at 460° C. or higher and 520° C. or lower while using a glass powder having a softening point of 410° C. or lower.

A cryogenic temperature measuring resistor element that is economical, and does not contain poisonous substances, and exhibits a small temperature measurement error can be realized by employing alumina powder as the material for the inorganic electric insulating powder, the alumina powder being inexpensive and exhibits comparatively high thermal conductivity among inorganic electric insulating materials, and employing the mixture of bismuth oxide ($Bi_2O_3$) as a main component, zinc oxide (ZnO), and boron oxide ($B_2O_3$) as a material for the glass powder that is chemically stable and easy to handle, not containing poisonous components such as lead, and has an electric insulation property and a softening point temperature of approximately 405° C.

Regarding the mixing ratio of the glass powder relative to the inorganic electric insulating powder in the filler, when the mixing ratio is smaller, the particles of the inorganic electric insulating powder are not connected sufficiently by the glass, and therefore the improvement in the thermal conductivity is limited and a positive side temperature measurement error is likely to occur due to the Joule heat. When the mixing ratio is greater, on the other hand, the glass properties become dominant, and the force restraining the temperature measuring resistor wire increases. A resulting thermal expansion difference between the temperature measuring resistor wire and the filler causes a variation in the length and sectional area of the temperature measuring resistor wire, and a variation in the internal strain of the temperature measuring resistor wire, leading to a variation in the electric resistance, and as a result, the temperature measurement error increases.

Thus, the temperature measurement error increases where the mixing ratio of the glass powder to the inorganic electric insulating powder is either smaller or greater. In this regard, by using alumina powder as the inorganic electric insulating powder, and a material containing bismuth oxide as a main component, zinc oxide, and boron oxide as the glass powder, and mixing them at a ratio of the glass powder within a range of 3.5 wt % to 10.0 wt %, the temperature measuring resistor element can be obtained that exhibits preferable thermal conductivity, and suppresses the force restraining the temperature measuring resistor wire, and exhibits a small temperature measurement error as shown by the results of the tests to be described later. A value of the mixing ratio of the glass powder is a proportion of the glass powder relative to a total weight of the inorganic electric insulating powder and the glass powder (hereafter, wt % indicating the amount of glass powder in the filler denotes a proportion relative to the total weight), and the specific gravity of the glass powder is 7.4.

An appropriate internal strain of a temperature measuring resistor wire which is made of an alloy of platinum including 0.5 mol % of cobalt can be obtained by setting the heating temperature to melt the glass powder at no lower than 460° C. and no higher than 520° C. As a result, the temperature measurement error decreases. However, it is not preferable to realize appropriate internal strain by the restraining force exerted on the temperature measuring resistor wire by the filler having an increased glass powder mixing ratio because the internal strain generated by the restraining force is brought about by a thermal expansion difference between the temperature measuring resistor wire and the filler, and therefore varies according to temperature. Also, the thermal expansion difference causes the length and sectional area of the temperature measuring resistor wire to vary, leading to an undesirable temperature measurement error. Hence, in the present invention, the internal strain is adjusted using the heating temperature to melt the glass powder, whereas the restraining force exerted by the filler is suppressed.

Since the restraining force exerted on the temperature measuring resistor wire by the filler is suppressed, forming the temperature measuring resistor wire into a coil shape brings about an effect of further reducing the variation in the length and sectional area of the temperature measuring resistor wire and the variation in the internal strain caused by the thermal expansion difference between the temperature measuring resistor wire and the filler, and thereby reducing the measurement error.

Furthermore, the aspect of the present invention described above can be applied easily to the structure of the widely used, conventional temperature measuring resistor element, and by applying the present invention thereto, a temperature measuring resistor element that is easy to manufacture and inexpensive can be realized. Note that in the conventionally structured temperature measuring resistor element, the opposite end portions of the through holes are sealed by the sealer made of an electric insulating material to keep the inorganic electric insulating powder in the through holes from falling out. However, in the cryogenic temperature measuring resistor element according to the present invention, the inorganic electric insulating powder is connected by the glass powder after melting the glass powder, therefore the possibility of falling out is eliminated. Hence, the sealer can be eliminated. Nevertheless, there is a possibility of the mixture of inorganic electric insulating powder and glass powder falling out during the manufacturing process prior to melting of the glass powder, unless a sealer is provided. This possibility can be avoided by providing the sealer. A polycrystalline adhesive having alumina, magnesia, silica, zircon, or a mixture of these materials as a main component may be used as a sealer in the same way as the conventional sealer. Heat-resistant temperatures of these adhesives are all at least 1000° C., which is sufficiently higher than the softening point of usual glass that is no higher than 800° C., and therefore the adhesives are not damaged by heating to melt the glass powder.

By replacing the inorganic electric insulating powder filled into the gaps between the housing and the temperature measuring resistor wire in the conventional temperature measuring resistor element with a mixture of inorganic electric insulating powder and glass powder, and heating the mixture to or above the melting temperature of the glass powder, consequently improving the thermal conductivity. This prevents the phenomena observed in the prior art that the temperature measurement error increases toward the positive side as the temperature decreases at temperatures of 90 K or less, the error increases particularly rapidly in the low temperature region of 10 K to 4 K, and the error increases when the measurement current is increased in order to increase the SN ratio, and thus can realize a temperature measuring resistor element that can measure temperatures with a high degree of precision without being affected by the measurement current value even in the cryogenic temperature region of 90 K to 4 K.

Figure 2:
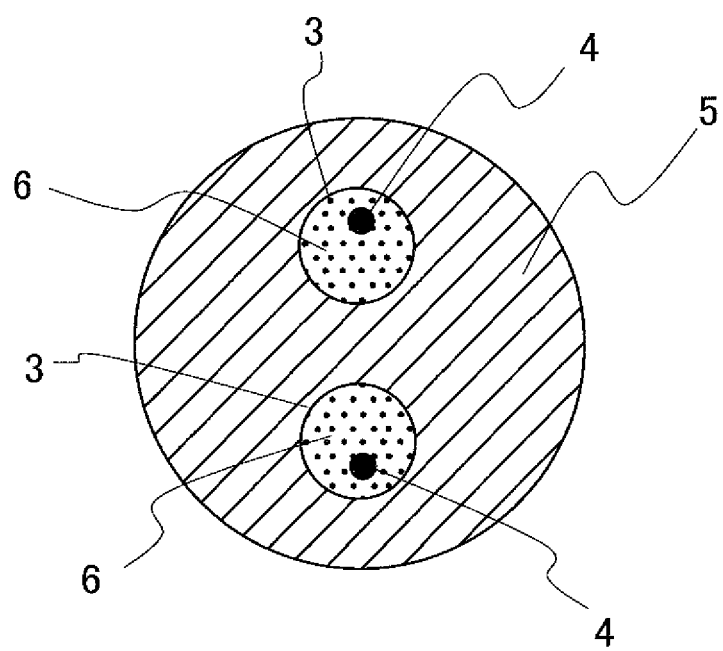
FIG. 2 is a sectional view of the cryogenic temperature measuring resistor element shown in FIG. 1, taken along II-II.

An embodiment of the present invention will be described below with reference to the attached drawings. FIGS. 1 and 2 show a specific structure of a temperature measuring resistor element according to an embodiment of the present invention. The basic frame is similar to the conventional structure, but the temperature measuring resistor element of the present invention has the following novel features. The conventional structure wherein the filler 6 is polycrystalline inorganic electric insulating powder is different from this embodiment wherein a mixture of a polycrystalline inorganic electric insulating powder and a glass powder of an amorphous electric insulating material are used, and the mixture is heated at a higher heating temperature than a softening point of the glass powder so as to melt the glass powder alone, and then cooled so as to solidify the glass powder.

FIG. 1 is the lengthwise direction sectional view, and FIG. 2 is the sectional view taken along II-II in FIG. 1. FIG. 1 shows an outer surface of a coil portion of a temperature measuring resistor wire 4.

As shown in FIG. 1, a temperature measuring resistor element 1 according to this embodiment includes an electric insulator 2 forming an outer shell, a temperature measuring resistor wire 4 accommodated in the electric insulator 2, and the filler 6, which is filled between the electric insulator 2 and the temperature measuring resistor wire 4.

The electric insulator 2 is a polycrystalline ceramic made of a material such as alumina, magnesia, silica, or a mixture of these materials, and is formed in a cylindrical shape that has a substantially circular cross-section, and includes two through holes in an axial direction. A preferable example of the electric insulator 2 is an electric insulator having an outer diameter of $\phi 1.4$ mm and a length of 10.5 mm, formed from a ceramic having a mixture of alumina and silica as a material. A diameter of the two through holes 3 is set at $\phi 0.4$ mm, for example. An electric insulator having a single through hole formed in a cylindrical shape may also be employed as another example of the electric insulator 2. In this case, the temperature measuring resistor wire 4 may be accommodated either in a folded back condition within the through hole or a non-folded back condition.

The temperature measuring resistor wire 4 is accommodated in the respective through holes 3 of the electric insulator 2. In this embodiment, the temperature measuring resistor wire 4 is a coil-shaped platinum-cobalt alloy. The temperature measuring resistor wire 4 is inserted so as to pass through the two through holes 3 in the electric insulator 2 such that one end portion and the other end portion of the temperature measuring resistor wire 4 project from identical sides of the respective through holes 3. A preferable example of the temperature measuring resistor wire 4 shown in FIGS. 1 and 2 is a wire having an outer diameter of $\phi 20$ μm and having a platinum-cobalt alloy including 0.5 mol % of cobalt as a material. As illustrated in Patent Document 1, the cobalt content may be set between 0.05 mol % and 2.0 mol %, for example. Instead of a platinum-cobalt alloy, another resistor wire used in a cryogenic temperature region, for example an alloy of rhodium and iron, may be employed.

Further, lead wires 5 are connected respectively to the one end portion and the other end portion of the temperature measuring resistor wire 4. A preferable example of the lead wire 5 includes an alloy of platinum and rhodium, which exhibits little electric resistance and therefore has little effect on a measured value of an electric resistance of the temperature measuring resistor wire.

The filler 6 is filled into the interior of the through holes 3. The filler 6 is filled between the electric insulator 2 and the temperature measuring resistor wire 4 so as to hold the temperature measuring resistor wire 4 mechanically, and also to function as a heat medium for radiating a Joule heat generated by a measurement current to the outside through the electric insulator 2. In this embodiment, the filler 6 is configured by a polycrystalline inorganic electric insulating powder made of a material such as alumina, magnesia, silica, a mixture thereof, or the like, and glass serving as an amorphous electric insulating material mixed into the inorganic electric insulating powder. The filler 6 is formed by mixing glass powder uniformly into the inorganic electric insulating powder, heating the mixture at or above a predetermined temperature to melt the glass powder, and then reducing the temperature to solidify the glass powder. The majority of the inorganic electric insulating powder is connected by the solidified glass.

As a result of this connection, the filler 6 exhibits high thermal conductivity even in a cryogenic temperature region and therefore maintains its function for radiating the Joule heat generated by the measurement current. Hence, the filler 6 has an effect of reducing a temperature measurement error in the cryogenic temperature region.

A preferable example of the inorganic electric insulating powder in the filler 6 is alumina powder, for example, which exhibits comparatively high thermal conductivity and is inexpensive.

Sealers 7 are provided on both end portions of the electric insulator 2. The sealers 7 are provided on both end portions of the electric insulator 2 to seal the end portions of the through holes 3 on both sides, thereby preventing the filler 6 filled into the interior of the through holes 3 from falling out. Sealing is performed using a polycrystalline adhesive having alumina, silica, zircon, or a mixture of these materials as a main component. In the present invention, the sealer 7 is not mandatory and may be omitted.

In manufacturing the temperature measuring resistor element 1 according to this embodiment, the temperature measuring resistor wire 4 is passed through the interior of the electric insulator 2 such that the respective end portions thereof are aligned on one end side of the electric insulator 2, as shown in FIG. 1. In this condition, the through holes 3a are filled with mixture obtained by uniformly mixing the inorganic electric insulating powder with the glass powder of an amorphous electric insulating material having a softening point lower than respective melting points of the electric insulator 2, the temperature measuring resistor wire 4, and the inorganic electric insulating powder. If necessary, sealing is made using the sealer 7. Next, the resulting assembly is inserted into an electric furnace and heated, say, for two hours at a preset heating temperature. In the case of the temperature measuring resistor element 1 using the temperature measuring resistor wire 4 made of an alloy of platinum and 0.5 mol %, heating temperature is set at or above the softening point of the glass powder, and preferably ranges between 460° C. or higher and 520° C. or lower where internal strain due to annealing of the temperature measuring resistor wire 4 occurs appropriately.

In the temperature measuring resistor element 1 subjected to heating processing in this manner, the glass powder in the filler 6 is melted in the interior. The glass powder melted is then solidified such that particles of the inorganic electric insulating powder are connected with one another by the glass. Thus, the temperature measuring resistor element 1 can enhance the effect of reducing the temperature measurement error in the cryogenic temperature region because the function of radiating the Joule heat generated by the measurement current even in the cryogenic temperature region can be maintained, and an internal strain occurs in the temperature measuring resistor wire 4 in an appropriate amount.

The glass powder melts and spreads through spaces in the inorganic electric insulating powder when heated to or above the softening point thereof. In addition, to ensure that melting occurs reliably in the aforesaid heating temperature range of no lower than 460° C. and no higher than 520° C., a material having a comparatively low softening point is preferably employed as the glass powder. For example, one preferable example is a glass powder having bismuth oxide as a main component and a softening point of approximately 405° C. In this case, even the lower limit heating temperature of 460° C. is at least 50° C. higher than the softening point, and therefore the glass powder can be melted reliably. Moreover, this glass produces non-lead glass powder containing substantially no harmful lead component.

In the cryogenic temperature measuring resistor element 1 according to this embodiment, the inorganic electric insulating powder includes alumina powder, and the glass powder has bismuth oxide as a main component with zinc oxide and boron oxide added thereto to obtain a specific gravity of 7.4. A mixing ratio of the glass powder in the filler 6 is preferably set within a range of 3.5 wt % to 10.0 wt %. The setting of the mixing ratio within this range makes it possible that the inorganic electric insulating particles are connected with one another by the glass which can sufficiently maintain high thermal conductivity in the cryogenic temperature region, and that the force restraining the temperature measuring resistor wire 4 is suppressed to thereby minimize the deformation of the temperature measuring resistor wire 4 and variation in the internal strain thereof caused by thermal expansion. As a result, a temperature measuring resistor element 1 that exhibits a small temperature measurement error even in the cryogenic temperature region can be obtained.

Next, effects of the present invention described above and test results supporting the above embodiment will be described.

Three tests 1 to 3 described below were performed. Common items in the test samples and contents of the three tests are as follows.

All of the test samples were configured as shown in FIGS. 1 and 2.

As for the temperature measuring resistor wire 4, a wire made of an alloy of platinum and 0.5 mol % of cobalt having an outer diameter of ϕ20 μm was used. As for the lead wire 5, a wire having an outer diameter of ϕ0.2 mm made of an alloy of platinum and rhodium was used.

As for the electric insulator 2, it was manufactured using a ceramic formed by molding a mixture of alumina and silica having an outer diameter of ϕ1.4 mm and a length of 10.5 mm. Diameter of the two through holes 3 provided in the lengthwise direction was set at ϕ0.4 mm. As for the sealer 7A, a heat-resistance adhesive having alumina as a main component was used.

As for filler 6, alumina powder into which glass powder was mixed was used. The glass powder includes bismuth oxide as a main component and zinc oxide and boron oxide added thereto, and has a specific gravity of 7.4 and a softening point temperature of 405° C.

After assembling these components into the shape shown in FIGS. 1 and 2, the cryogenic temperature measuring resistor element 1 was formed by applying heating to melt the glass powder. Note that the heating time for melting the glass powder was set at two hours, and the electric resistance value was measured by the four-wire system.

[Test 1: Test Relating to Heating Temperature to Melt Glass Powder]

The electric resistance value of the temperature measuring resistor wire, material of which includes a platinum-cobalt alloy varies in accordance with the amount of internal strain. The degree of annealing of the temperature measuring resistor wire varies in accordance with the heating temperature to melt the glass powder, leading to a variation in the amount of internal strain. Therefore, the temperature measurement error increases or decreases in accordance with the heating temperature to melt the glass powder.

To determine a heating temperature to realize appropriate internal strain and a small temperature measurement error, five samples of the cryogenic temperature measuring resistor element according to the present invention were manufactured with the mixing ratio of the glass powder mixed into the alumina powder of the filler 6 set at 4.2 wt %. The heating temperature to melt the glass powder in the respective samples was varied within a range of 455° C. to 540° C., and the temperature measurement error at 90 K and 10 K was tested. These heating temperatures were at least 50° C. higher than the softening point temperature 405° C. of the glass powder used in the tests.

The current for measuring the electric resistance value was set at 2 mA, and the temperature measurement error was measured by using a germanium thermometer, as a standard thermometer, calibrated by a public institution.

It has not yet been established an official standard such as JIS specifying a relationship between the electric resistance value and the temperature of a temperature measuring resistor wire, material of which includes a platinum-cobalt alloy, and therefore, respective manufacturers have slightly different relationship between the temperature and the electric resistance value set in their measuring instruments which outputs the temperature by measuring the electric resistance of the temperature measuring resistor wire, material of which includes a platinum-cobalt alloy, and converting the electric resistance into a temperature.

Figure 3:
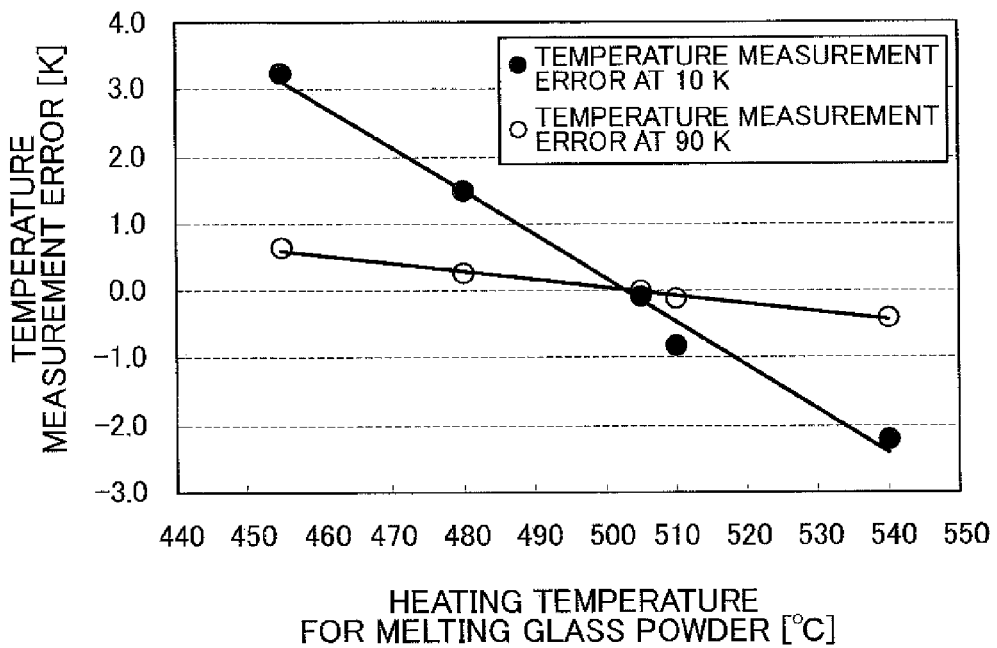
FIG. 3 is a graph showing results of a test of a relationship between a temperature measurement error and a heating temperature to melt glass powder according to the present invention, performed using a measuring instrument that is made to output a temperature on the higher side in accordance with a set value of a relationship between an electric resistance value and a temperature.
Figure 4:
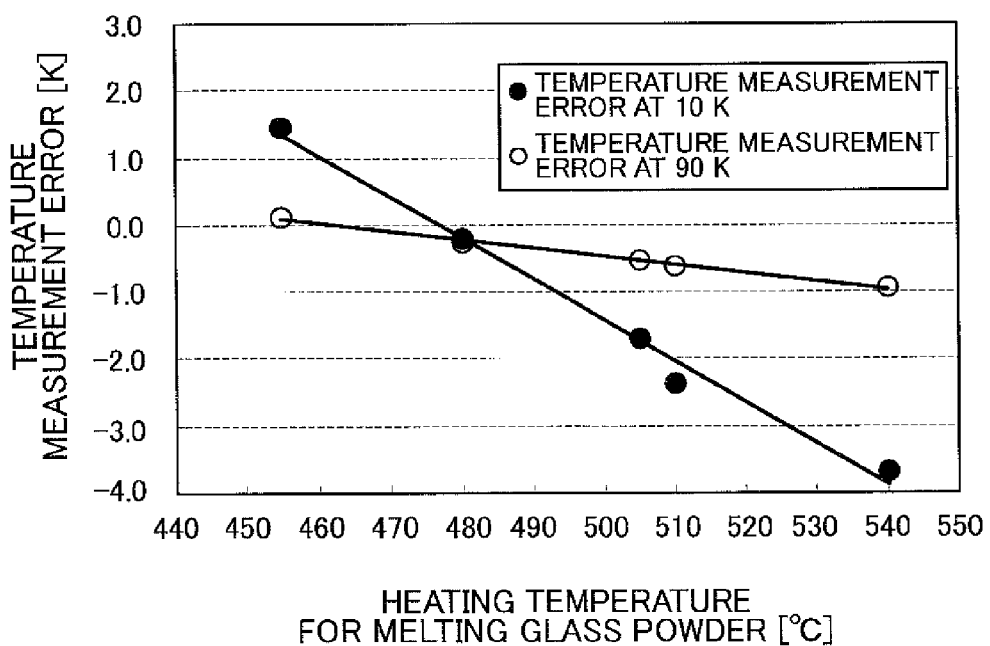
FIG. 4 is a graph showing results of the test of the relationship between the temperature measurement error and the heating temperature to melt the glass powder according to the present invention, performed using a measuring instrument that is made to output the temperature on the lower side in accordance with the set value of the relationship between the electric resistance value and the temperature.

The test was implemented using a measuring instrument that is made to output a temperature on the higher side in accordance with the relationship between the electric resistance value and the temperature set in the measuring instrument, and a measuring instrument that is made to output a temperature on the lower side in accordance with this relationship. Table 2 shows test results, and FIGS. 3 and 4 show graphs according to Tables 2.

TABLE 2

[TEST RESULTS OF TEST 1]

| MEASURING INSTRUMENTS USED IN TEST | HEATING TEMPERATURE TO MELT GLASS POWDER | TEMPERATURE MEASUREMENT ERROR AT 10 K | TEMPERATURE MEASUREMENT ERROR AT 90 K |
|---|---|---|---|
| INSTRUMENT 1 | 455° C. | +3.2 K | +0.6 K |
|  | 480° C. | +1.5 K | +0.3 K |
|  | 505° C. | −0.1 K | 0.0 K |
|  | 510° C. | −0.8 K | −0.1 K |
|  | 540° C. | −2.2 K | −0.4 K |
| INSTRUMENT 2 | 455° C. | +1.4 K | +0.1 K |
|  | 480° C. | −0.2 K | −0.3 K |
|  | 505° C. | −1.7 K | −0.5 K |
|  | 510° C. | −2.4 K | −0.6 K |
|  | 540° C. | −3.7 K | −0.9 K |

Instrument 1 on Table 2 denotes a measuring instrument that is made to output a temperature on the higher side in accordance with the relationship between the electric resistance value and the temperature set in the measuring instrument, and the test results obtained using this measuring instrument are as shown in FIG. 3. Instrument 2 denotes a measuring instrument that is made to output a temperature on the lower side, and the test results obtained using this measuring instrument are as shown in FIG. 4. It is evident from FIG. 3 that when the heating temperature to melt the glass powder is set within a range of 490° C. to 520° C., the temperature measurement error is within approximately 1° C. Further, it is evident from FIG. 4 that the temperature measurement error is within approximately 1° C. within a range of 460° C. to 490° C.

The results of FIGS. 3 and 4 show that in the temperature measuring resistor element according to the present invention, by setting the heating temperature to melt the glass powder at no lower than 460° C. and no higher than 520° C. and at least 50° C. higher than the softening point temperature of the glass powder, a temperature measurement error of no more than approximately 1° C. is obtained from 90 K to 10 K using any of a measuring instrument that is made to output a temperature on the higher side in accordance with the set relationship between the electric resistance value and the temperature, a measuring instrument that is made to output a temperature on the lower side, and a measuring instrument that outputs an intermediate temperature.

The results of FIG. 3 further show that when the heating temperature to melt the glass powder is set at 503° C. and a measuring instrument that is made to output a temperature on the higher side in accordance with the set relationship between the electric resistance value and the temperature is used, the temperature measurement error is substantially zero. In the following tests, therefore, the heating temperature to melt the glass powder is set at 503° C. and a measuring instrument that is made to output a temperature on the higher side in accordance with the set relationship between the electric resistance value and the temperature is used.

[Test 2: Test for Inspecting Relationship Between Mixing Ratio of Glass Powder and Error Caused by Joule Heat]

The temperature measurement error in the test results of FIGS. 3 and 4 contains an error caused by the Joule heat generated by the current passed through the temperature measuring resistor wire 4 to measure the electric resistance value. Following test was implemented for inspecting as to whether the alumina powder particles have been connected by the glass such that sufficient Joule heat is radiated.

In the aforesaid JISC1604, three currents, namely 0.5 mA, 1 mA, and 2 mA, are defined as currents for measuring the electric resistance value of a temperature measuring resistor. However, 2 mA is preferably employed to increase the SN ratio and suppress the effect of noise. To evaluate a positive side temperature measurement error caused by the Joule heat generated at a measurement current of 2 mA, variation in a temperature measurement value following an increase in the current from 0.2 mA to 2 mA was tested at various glass powder mixing ratios.

Figure 5:
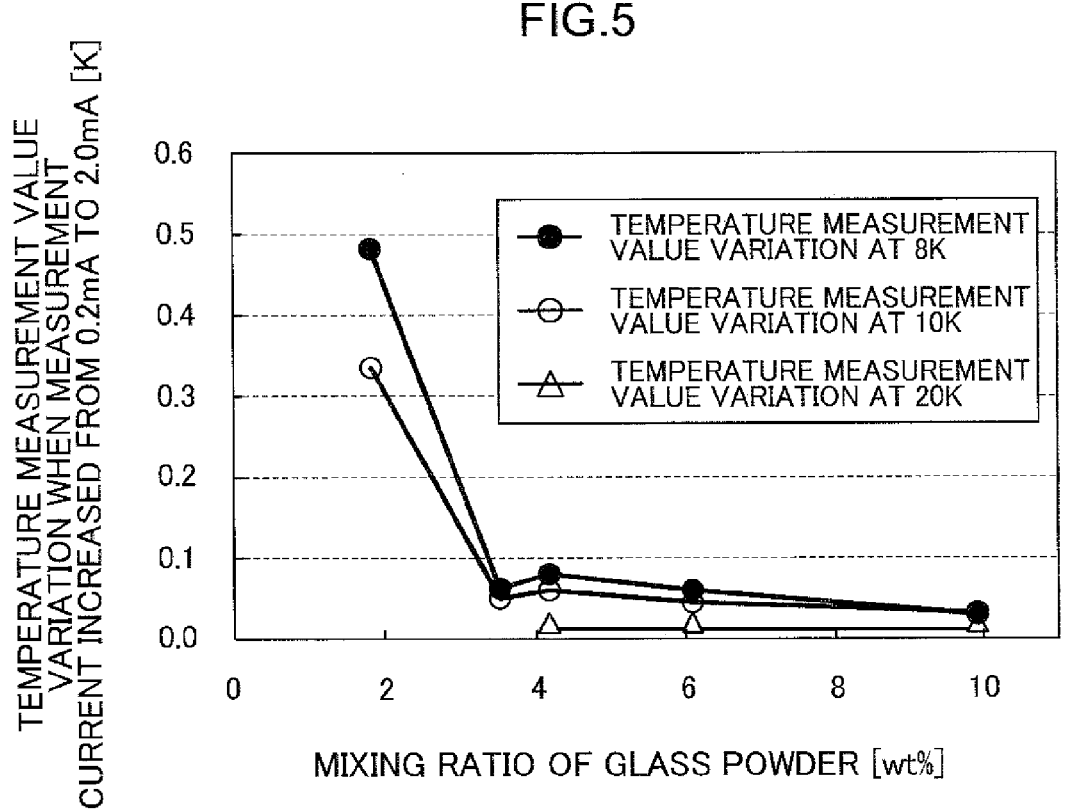
FIG. 5 is a graph showing results of a test of a relationship between a mixing ratio of the glass powder according to the present invention and a variation in a temperature measurement value when an electric resistance value measurement current is increased.

Table 3 shows results obtained by testing variation in temperature measurement values under conditions where measurement current is changed with respect to the cryogenic temperature measuring resistor elements according to the present invention. Each of mixing ratios of the glass powder mixed into the alumina powder of the filler 6 was set at five variations: 1.8 wt %, 3.5 wt %, 4.2 wt %, 6.1 wt %, and 9.9 wt %. FIG. 5 shows a graph according to Table 3. The test was performed at temperatures of 8 K and 10 K. For the mixing ratios of 4.2 wt % and above, the test was also performed at 20 K.

TABLE 3

[MEASUREMENT RESULTS OF TEST 2]

| MIXING RATIO OF GLASS POWDER | TEMPERATURE MEASUREMENT VALUE VARIATION WHEN MEASUREMENT CURRENT INCREASED FROM 0.2 mA to 2.0 mA | | |
|---|---|---|---|
|  | 8 K | 10 K | 20 K |
| 1.8 wt % | +0.48 K | +0.33 K | — |
| 3.5 wt % | +0.06 K | +0.05 K | — |
| 4.2 wt % | +0.08 K | +0.06 K | +0.02 K |
| 6.1 wt % | +0.06 K | +0.05 K | +0.02 K |
| 9.9 wt % | +0.03 K | +0.03 K | +0.02 K |

As shown in FIG. 5, when the mixing ratio of the glass powder is at or above 3.5 wt %, variation in the temperature measurement value remains at or below the minute value of 0.1° C. even after the current for measuring the electric resistance value is increased from 0.2 mA to 2 mA. The Joule heat is proportionate to the square of the current. Therefore, the Joule heat is considered to increase 100 times in this case, and the Joule heat can be seen to be radiated sufficiently to the outside. Consequently, even when the maximum current 2 mA defined by JIS for measuring the electric resistance value is applied, the error occurring on the positive side due to the Joule heat remains small enough to be ignored, provided that the mixing ratio of the glass powder is within a range of 3.5 wt % to at least 10.0 wt %.

In FIG. 5, when the mixing ratio is set at 1.8 wt %, the temperature measurement value increases to the positive side as the current increases. It can be seen that the connection is insufficient due to too small amount of glass, and therefore the generated Joule heat remains in the interior, causing the temperature of the temperature measuring resistor wire to rise.

[Test 3: Test for Inspecting Temperature Measurement Error in Low Temperature Region of 10 K to 4 K]

The cryogenic temperature measuring resistor element according to the present invention was manufactured with the mixing ratio of the glass powder mixed into the alumina powder of the filler 6 set at 7.7 wt %. The temperature measurement error in a low temperature region of 4K to 10 K was tested. The temperature measurement error was measured using a germanium thermometer as a standard thermometer, which is calibrated by a public institution.

Figure 6:
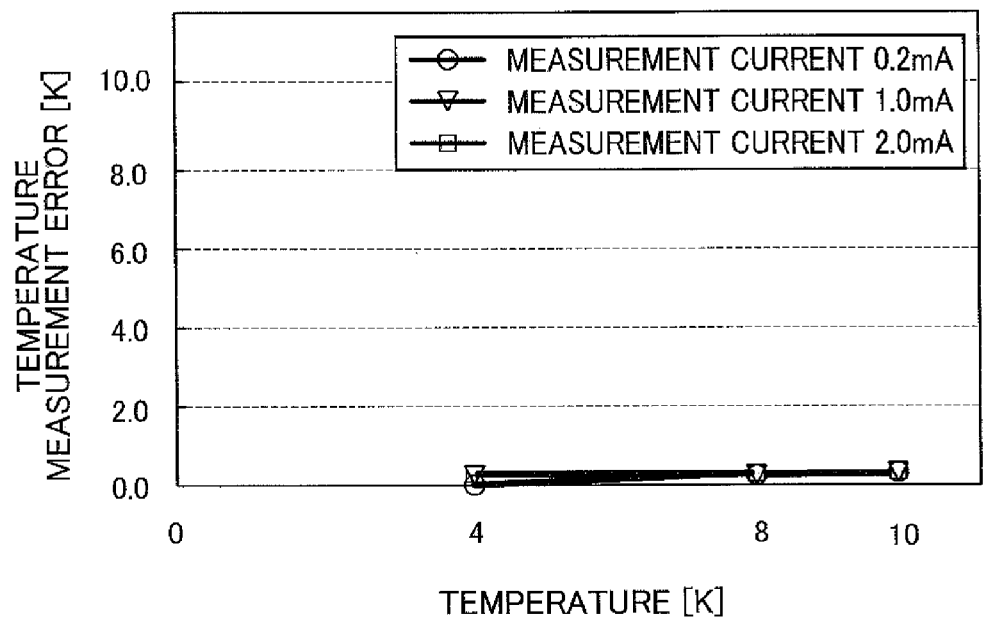
FIG. 6 is a graph showing a relationship between the temperature measurement error and a measured temperature obtained by the cryogenic temperature measuring resistor element according to the present invention.

Table 4 shows test results obtained at measurement currents of 0.2 mA, 1 mA, and 2 mA, and FIG. 6 shows a graph according to Table 4.

TABLE 4

[MEASUREMENT RESULTS OBTAINED BY TEMPERATURE MEASURING RESISTOR ELEMENT ACCORDING TO PRESENT INVENTION IN TEST 3]

| | TEMPERATURE MEASUREMENT ERROR | | |
|---|---|---|---|
| MEASURED TEMPERATURE | MEASUREMENT CURRENT 0.2 mA | MEASUREMENT CURRENT 1.0 mA | MEASUREMENT CURRENT 2.0 mA |
| 4 K | 0.0 K | +0.1 K | +0.1 K |
| 8 K | +0.1 K | +0.1 K | +0.1 K |
| 10 K | +0.1 K | +0.1 K | +0.1 K |

Figure 7:
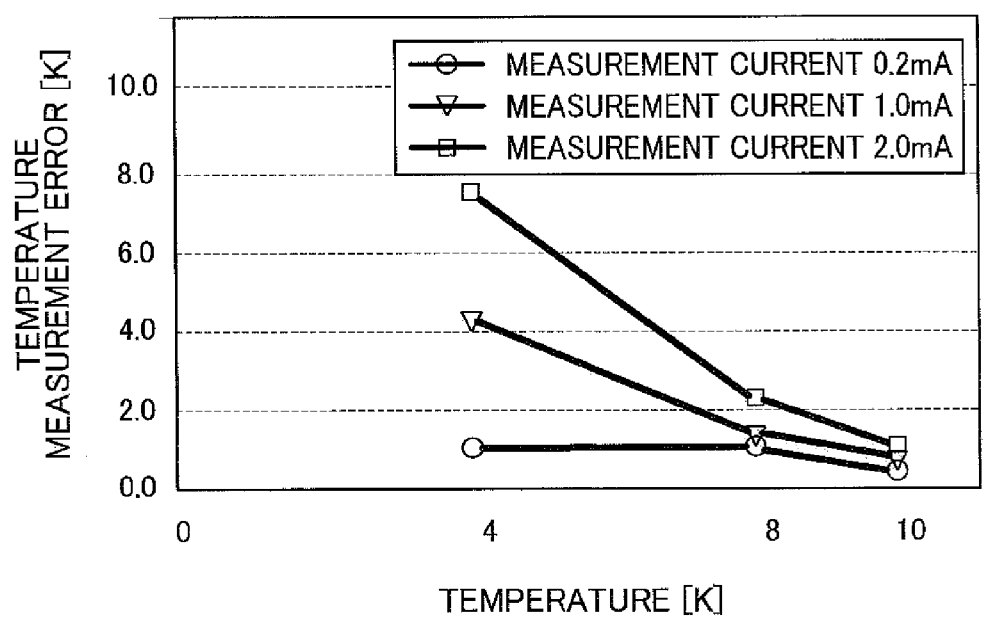
FIG. 7 is a graph showing the relationship between the temperature measurement error and the measured temperatures of cryogenic temperature measuring resistor elements for comparison with a conventional example.

The conventional temperature measuring resistor element, the temperature measurement error of which is shown on Table 1 and in FIG. 7, differs from the temperature measuring resistor element used in Test 3 only in that glass powder is not mixed into the filler 6 and heating for melting the glass powder is not performed. All other structures, dimensions, and materials are identical.

When the temperature measurement error of Table 4 and FIG. 6 is compared with the temperature measurement error in the conventional temperature measuring resistor element shown on Table 1 and in FIG. 7, it can be seen that by mixing glass powder into the filler 6 and melting the glass powder, the error is greatly reduced.

The present invention is not limited to the embodiment described above, and various modifications may be added thereto within a scope that does not depart from the spirit of the present invention.

For example, at the start of the description of this embodiment, the dimensions and materials of the electric insulator and temperature measuring resistor wire and the materials of the lead wire, the sealer, the inorganic electric insulating powder, and the glass powder are described, but the dimensions and materials of the cryogenic temperature measuring resistor element according to the present invention are not limited thereto.

For example, a ceramic formed by molding a boron nitride polycrystal may be used as the material for the electric insulator 2, and polycrystalline boron nitride powder may be used as the inorganic electric insulating powder.

The outer diameter of the temperature measuring resistor wire is not limited to 20 μm. Further, a low electric resistance material other than an alloy of platinum and rhodium may be used as the lead wire, and any electric insulating adhesive that can withstand the heating temperature to melt the glass powder may be used as the sealer.

Moreover, any material may be applied as the material for the glass powder as long as the softening point temperature thereof is not high enough to give a large variation to the internal strain of the temperature measuring resistor wire.

The cryogenic temperature measuring resistor element according to the present invention is suitable as a temperature sensor element for measuring a temperature in a cryogenic temperature region of 4 K to 90 K, such as a temperature in a cryopump or a temperature in a hydrogen station.

The method according to the present invention of mixing glass powder into the inorganic electric insulating powder and melting the glass powder can keep the thermal conductivity from reducing due to liquefaction and solidification of a gas such as air existing in the through holes during use in a low temperature region.

When the thermal conductivity decreases, the heat movement amount decreases such that the temperature of the temperature measuring resistor wire does not respond favorably to a temperature variation in the measurement subject. As a result, a response speed of the temperature measurement decreases. With the method according to the present invention of mixing glass powder into the inorganic electric insulating powder and melting the glass powder, a reduction in the thermal conductivity due to liquefaction and solidification does not occur, and therefore this problem can be avoided.

A sheath thermocouple, in which a thermocouple element is accommodated in a metal sheath with an inorganic electric insulating powder, may often be used as a temperature sensor for use in a cryogenic temperature region. In the case of a sheath thermocouple, the current for measuring the electric resistance value is not required, and therefore, in contrast to a temperature measuring resistor element, the temperature measurement error caused by the Joule heat generated by the measurement current does not occur even when a gas such as air existing in spaces in the inorganic electric insulating powder liquefies and solidifies during use in a cryogenic temperature region, leading to reducing thermal conductivity. However, reducing the thermal conductivity causes to reduce the response speed of temperature measurement.

By applying the method according to the present invention of preventing the thermal conductivity from reducing by mixing glass powder into the inorganic electric insulating powder and melting the glass powder to the inorganic electric insulating powder on a periphery of a temperature measurement point (a junction between a positive thermocouple element and a negative thermocouple element) of the sheath thermocouple, reducing the thermal conductivity caused by liquefaction and solidification of air in the interior of the sheath can be eliminated, and as a result, a sheath thermocouple capable of keeping the response speed of temperature measurement from reducing even during use in a cryogenic temperature region can be realized.

Furthermore, for a sheath type resistance temperature detector in which a temperature measuring resistor element is accommodated in a metal sheath with an inorganic electric insulating powder, in the case that a cryogenic temperature measuring resistor element according to the present invention is used as a temperature measuring resistor element for using in a low temperature region, by the present invention method of mixing the glass powder into the inorganic electric insulating powder on the periphery of the temperature measuring resistor element and melting the glass powder, a thermal conductivity decrease, which is likely to be caused by liquefaction and solidification not only of the air in the interior of the cryogenic temperature measuring resistor but also air between the sheath and the temperature measuring resistor element, can be eliminated. This can realize a sheath type resistance temperature detector which has a higher response speed in the temperature measurement and a smaller temperature measurement error due to the Joule heat generated by the measurement current during use in a cryogenic temperature region.

The invention claimed is:

1. A method for producing a cryogenic temperature measuring resistor element, comprising the steps of:
    preparing a temperature measuring resistor wire and a housing for accommodating the temperature measuring resistor wire;
    preparing a mixture of polycrystalline inorganic electric insulating powder and glass powder of an amorphous electric insulating material with each other, the glass powder having a lower softening point than respective melting temperatures of the inorganic electric insulating powder, the temperature measuring resistor wire, and the housing;
    filling the mixture between the housing and the temperature measuring resistor wire;
    heating the mixture at a temperature higher than the softening point of the glass powder and lower than the respective melting temperatures of the temperature measuring resistor wire, the housing, and the inorganic electric insulating powder so as to melt only the glass powder; and
    cooling the mixture so as to solidify the melted glass to connect particles of the inorganic electric insulating powder with one another.

2. The method according to claim 1, wherein the temperature measuring resistor wire is made of an alloy of platinum and cobalt, and has the shape of a coil.

3. The method according to claim 2, wherein the alloy of platinum and cobalt contains 0.5 mol % of cobalt, and
    the temperature at which the glass powder is melted is 460° C. or higher and 520° C. or lower, and 50° C. or more higher than the softening point of the glass powder.

4. The method according to claim 3, wherein the inorganic electric insulating powder includes alumina powder,
    the glass powder includes bismuth oxide as a main component, zinc oxide and boron oxide, and
    a mixing ratio of the glass powder to the filler is within a range of 3.5 wt % to 10.0 wt %.

5. The method according to claim 1, wherein the opposite ends of the temperature measuring resistor wire are connected with a lead wire,
    wherein the housing includes an electric insulator in the shape of a cylinder having a substantially circular cross-section, and including two through holes in an axial direction,
    the temperature measuring resistor wire extends through the through holes, the opposite ends exposing from end portions of the through holes, the end portions being on the same side of the through holes, and
    the mixture is in a gap between the inner wall of the through holes and the temperature measuring resistor wire.

6. The method according to claim 5, wherein the opposite end portions of the through holes are sealed by a sealer of an electric insulating material.

* * * * *